(12) United States Patent
Ma et al.

(10) Patent No.: US 6,840,881 B2
(45) Date of Patent: Jan. 11, 2005

(54) TRANSMISSION MECHANISM WITH A CASELESS DIFFERENTIAL MECHANISM

(75) Inventors: Weijin Ma, Xinjiang (CN); Mingxue Yang, Xinjiang (CN); Yuijang Wang, Xinjiang (CN); Yingpu Wang, Xinjiang (CN); Bin Liang, Xinjiang (CN); Yongge Fan, Xinjiang (CN); Wenbin Pan, Xinjiang (CN); Feng Gao, Beijing (CN)

(73) Assignee: Xinjiang Shengsheng Co., Ltd., Beijing (CN)

( * ) Notice: Subject to any disclaimer, the term of this patent is extended or adjusted under 35 U.S.C. 154(b) by 0 days.

(21) Appl. No.: 10/660,925

(22) Filed: Sep. 12, 2003

(65) Prior Publication Data

US 2004/0050196 A1 Mar. 18, 2004

(30) Foreign Application Priority Data

Sep. 12, 2002 (CN) .......................................... 02253903

(51) Int. Cl.$^7$ ..................... F16H 37/08; F16H 48/06; F16H 3/08
(52) U.S. Cl. ..................... 475/203; 475/225; 74/331
(58) Field of Search ................... 475/200, 203, 475/206, 221, 225; 74/329, 331

(56) References Cited

U.S. PATENT DOCUMENTS

| 2,805,586 | A | * | 9/1957 | Lucas | .......................... 475/206 |
| 3,753,376 | A | * | 8/1973 | Ribeiro | ....................... 475/206 |
| 4,055,091 | A | * | 10/1977 | Kerr | ............................. 475/16 |
| 5,405,300 | A | * | 4/1995 | Sakita | ......................... 475/225 |

* cited by examiner

*Primary Examiner*—Roger Pang
(74) *Attorney, Agent, or Firm*—Wyatt, Tarrant & Combs, LLP

(57) ABSTRACT

The present invention provides a transmission mechanism with a caseless differential mechanism for an automotive vehicle to drive four wheels instead of two differential mechanisms of the prior art disposed on the front axle and rear axle. The transmission mechanism of the invention is of a compact structure and a relatively less cost of manufacturing, and makes a clearance between the chassis of the automotive vehicle and the ground increased. The performance of the automotive vehicle equipped with the transmission mechanism of the invention can be improved.

20 Claims, 3 Drawing Sheets

TRANSMISSION MECHANISM WITH A CASELESS DIFFERENTIAL MECHANISM

CROSS-REFERENCE TO RELATED APPLICATION

Chinese patent application CN 02 2 53903.4 filed Sep. 12, 2002.

STATEMENT REGARDING FEDERALLY SPONSORED RESEARCH OR DEVELOPMENT

Not Applicable

BACKGROUND OF THE INVENTION

1. Field of the Invention

The present invention relates to a transmission mechanism of automotive vehicles, and more particularly to a transmission mechanism with a caseless differential mechanism.

2. Description of the Related Art

Many transmission mechanisms with a differential gear lock limiting mechanism have been used in automotive vehicles. Because when an automotive vehicle encounters weaker roads, such as loose soil, foothill and the like, two wheels of the automotive vehicle at the same side may lose adhesions to the ground to cause skidding. The differential gear lock limiting mechanism can limit different rotating speeds of the two wheels up to locking the differential gear of the automotive vehicle. In this case, the driving side shafts of the two sides will be integrated, and the automotive vehicle can only be driven in line. Moreover, the differential gear lock limiting mechanism used in the art is complicated, expensive and difficult to maintain.

Hence, a transmission mechanism that overcomes the above-mentioned problems is desired.

SUMMARY OF THE INVENTION

Accordingly, an object of the present invention is to provide a transmission mechanism that overcomes the shortcomings in the prior art.

The transmission mechanism for an automotive vehicle of the present invention comprises a housing having a first bearing bracket disposed at the upper portion thereof, a second bearing bracket disposed at the lower portion thereof, a third bearing bracket disposed at the left portion thereof and a fourth bearing bracket disposed at the right portion thereof; a caseless differential mechanism including a right side bevel gear, a left side bevel gear and a ring gear; a driving power input shaft mounted within the first bearing bracket of the housing; a first dual tandem gear mounted on the driving power input shaft; a second dual tandem gear mounted on the driving power input shaft; a first sliding gear slidably fixed on the driving power input shaft; a rear right wheel output shaft mounted within the third bearing bracket; a fourth gear fixed to the rear right wheel output shaft; a third dual tandem gear mounted on the rear right wheel output shaft; a core shaft mounted within the fourth bearing bracket, on which the caseless differential mechanism is mounted; a fifth gear connected with the left side bevel gear; a sixth gear connected with the right ride bevel gear; a propeller shaft mounted within the second bearing bracket; a second sliding gear mounted on a shaft sleeve of the propeller shaft; a third sliding gear fixed to the propeller shaft; a slidable engaging member connected with the propeller shaft; a front left wheel output shaft engaged with the slidable engaging member; and a front right wheel output shaft engaged with the slidable engaging member. When the driving power input shaft is driven, the first sliding gear can be regulated to mesh with either the third dual tandem gear or the second dual tandem gear so that the automotive vehicle can obtain different speeds, and wheels at the same side of the automotive vehicle can be driven at the same time.

In one embodiment of the present invention, the fifth gear is mounded on a left shaft sleeve extended from the left side bevel gear, and a sixth gear is provided to be mounted on a right shaft sleeve extended from the right ride bevel gear.

In another embodiment of the invention, the second dual tandem gear includes a second larger gear and an inner gear disposed at a side surface opposite to the first sliding gear to mesh therewith, and the third dual tandem gear includes a third larger gear and a third smaller gear to mesh with the first sliding gear and the second larger gear of the second dual tandem gear, respectively.

In the present invention, the first dual tandem gear may include a first larger gear and a first smaller gear to respectively mesh with the fifth gear and the fourth gear, and the front left wheel output shaft may be mounted within the front right wheel output shaft. Each of the first sliding gear and the slidable engaging member may provide a recess at the outer surface thereof for connecting a fork that extends out of the housing.

The transmission mechanism of the present invention makes use of a caseless differential mechanism to drive four wheels instead of two differential mechanisms in the prior art disposed on the front axle and rear axle. Therefore, the transmission mechanism is of a compact structure, which increases the clearance between the chassis of the automotive vehicle and the ground. Furthermore, the caseless differential mechanism used makes speeds between the left side wheels and the right side wheels different. Thus, the performance of the automotive vehicle is improved and the automotive vehicle can be steered smoothly.

Other objects, features and advantages of the present invention will become apparent from the following detailed description when read in conjunction with the accompanying drawings.

DETAILED DESCRIPTION OF PREFERRED EMBODIMENTS OF THE INVENTION

The present invention will be further described below with reference to the drawings.

Figure 1:
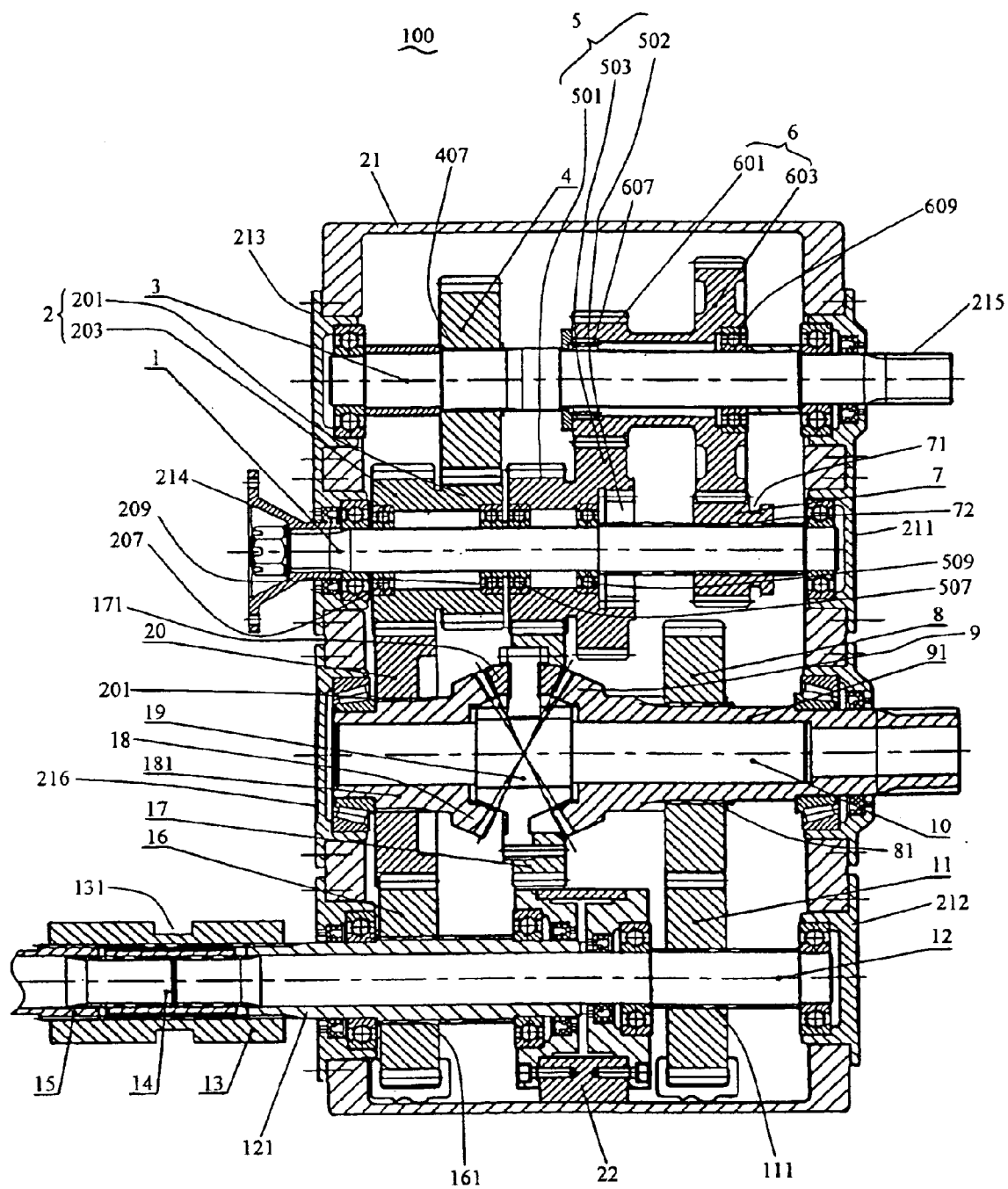
FIG. 1 is a schematic plan view of a transmission mechanism in accordance with the present invention.
Figure 2:
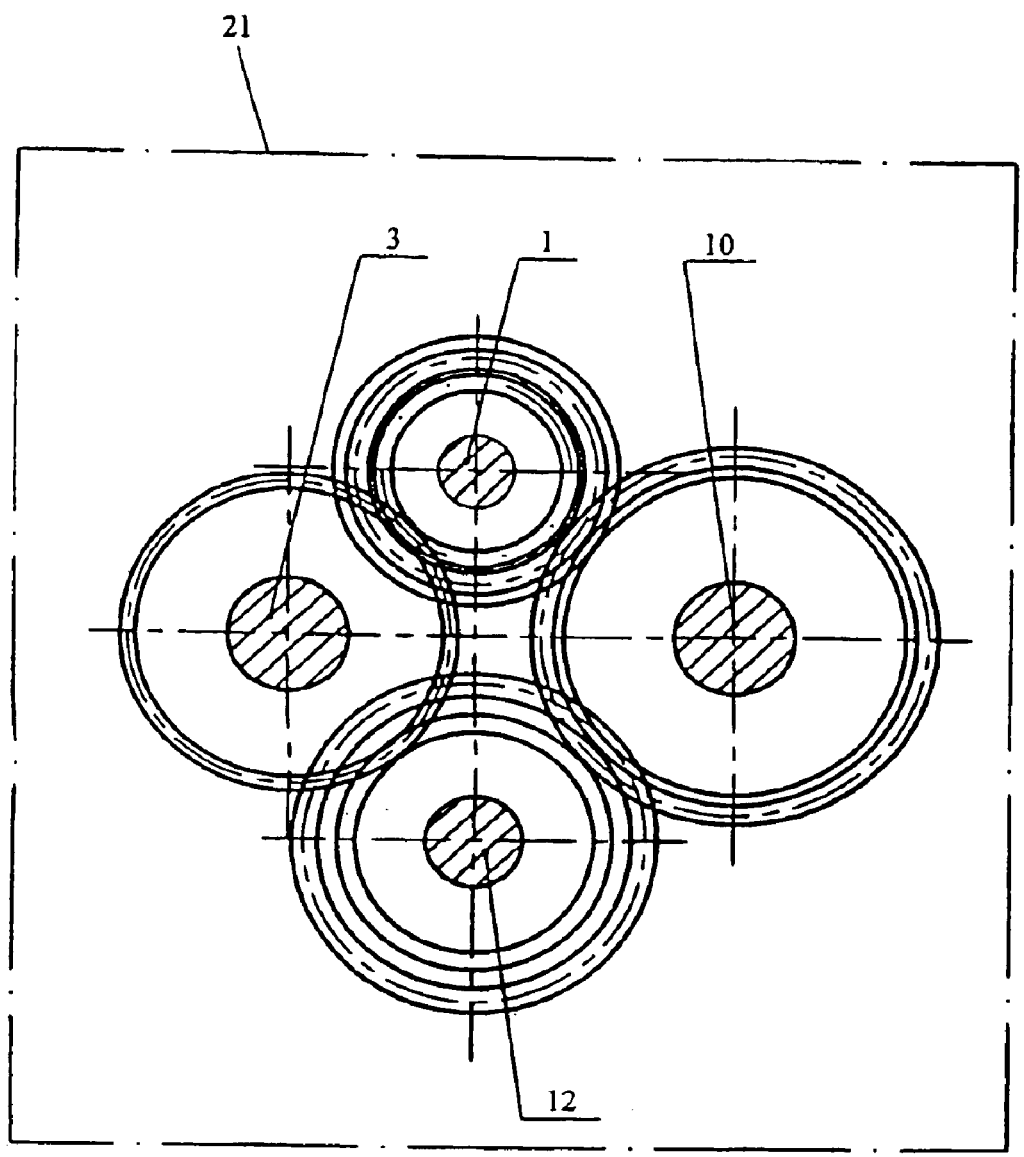
FIG. 2 is a schematic and sketching side view showing the location of shafts of the transmission mechanism as shown in FIG. 1.
Figure 3:
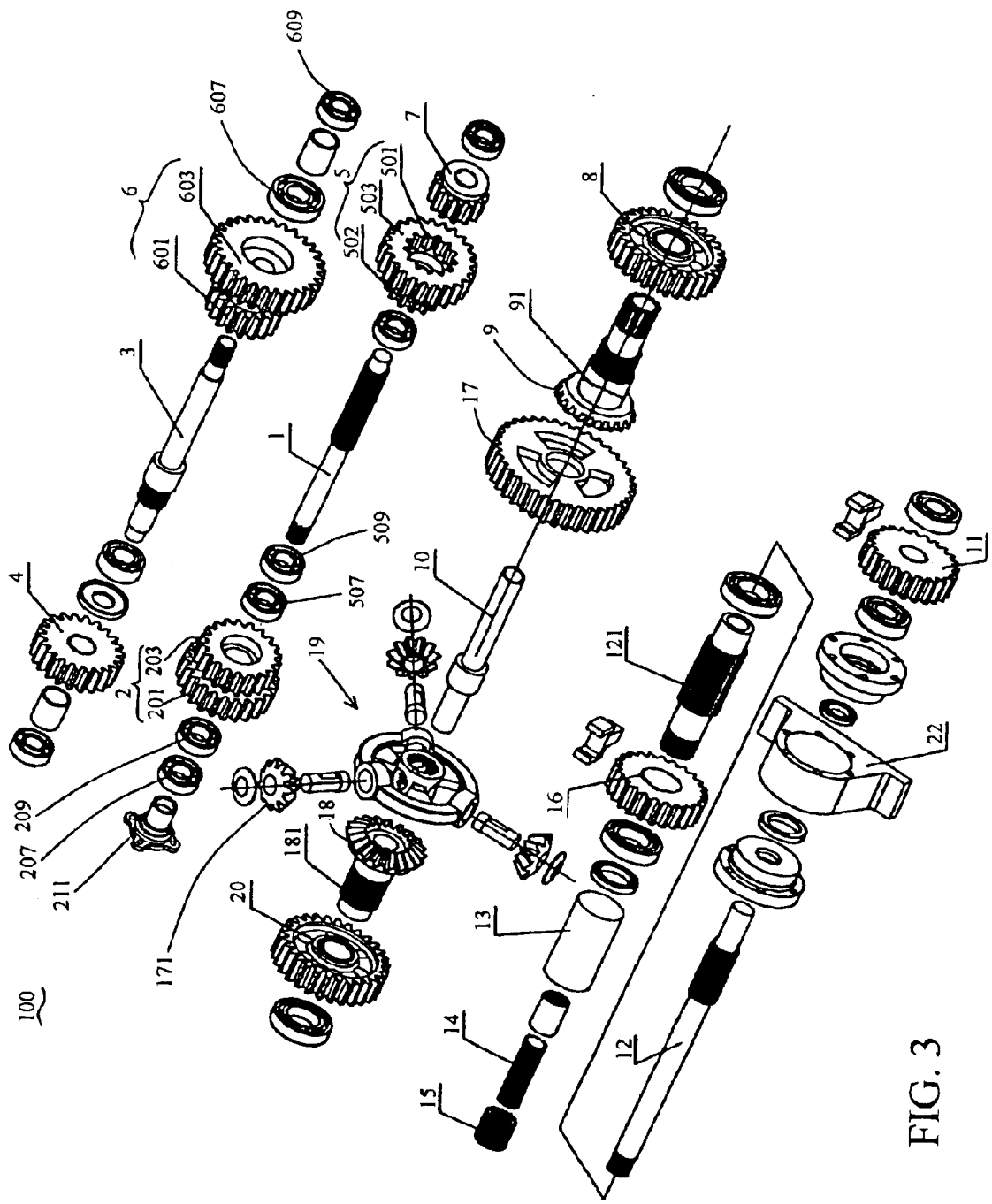
FIG. 3 is a schematically exploded view of the transmission mechanism as shown in FIG. 1.

Referring to FIGS. 1 to 3, a transmission mechanism 100 of an automotive vehicle in accordance with the present invention includes a housing 21, a rear right wheel output shaft 3, a driving power input shaft 1, a core shaft 10, a front left wheel output shaft 14, a front right wheel output shaft 15, a propeller shaft 12, and a caseless differential mechanism 19 mounted at the right side of the housing 21 and including a right side bevel gear 9, a left side bevel gear 18 and a ring gear 17. The housing 21 has a first bearing bracket 211 disposed at the upper portion thereof, a second bearing bracket 212 disposed at the lower portion thereof, a third bearing bracket 213 disposed at the left portion thereof and a fourth bearing bracket 216 disposed at the right portion thereof.

The driving power input shaft 1 is connected with an engine (not shown) of the automotive vehicle via a first connecting member 214 and mounted within the first bearing bracket 211. A first dual tandem gear 2 having a first larger gear 203 and a first smaller gear 201 is mounted on the input shaft 1 via two ball bearings 207, 209. A first sliding gear 7 is slidably mounted to the driving power input shaft 1 via a first spline 72 and can move along the input shaft 1. A having a second larger gear 503 and a second smaller gear 501, is mounted on the input shaft 1 via two ball bearings 507, 509 and disposed between the first gear 7 and the first dual tandem gear 2. The second dual tandem gear 5 provides an inner gear 502 extended inward from a side surface of the second larger gear 503 to mesh with the first sliding gear 7.

The rear right wheel output shaft 3 is connected with a rear right wheel (not shown) of the automotive vehicle via a second connecting member 215 and mounted within the third bearing bracket 213. A fourth gear 4 is fixed to the rear right wheel output shaft 3 via a second spline 407 to mesh with the first smaller gear 201 of the first dual tandem gear 2, and a third dual tandem gear 6 including a third larger gear 603 and a third smaller gear 601 to mesh with the first sliding gear 7 and the second larger gear 503 of the second dual tandem gear 5, respectively, is mounted on the rear right wheel output shaft 3 via a roller bearing 607 and a ball bearing 609.

Elements of the caseless differential mechanism 19 used in this invention are the same as those in the prior art except those specifically described herein. The core shaft 10 is mounted within the fourth bearing bracket 216. The right side bevel gear 9 and the left side bevel gear 18 are mounted on the core shaft 10. A left shaft sleeve 181 is provided by extending the left side bevel gear 18 leftward to be fixed to the core shaft 10. A fifth gear 20 for meshing with the first larger gear 203 of the first dual tandem gear 2 is mounted to the shaft sleeve 181 via a third spline 201. A sixth gear 8 is mounted to a right shaft sleeve 91 of the right ride bevel gear 9 via a fourth spline 81. The ring gear 17 of the differential mechanism 19 meshing with the second smaller gear 501 of the second dual tandem gear 5 is fixed on the periphery of planetary gears 171 of the caseless differential mechanism 19.

The propeller shaft 12 is mounted within the second bearing bracket 212, supported by a seventh bearing bracket 22 and coaxially connected with a slidable engaging member 13. A second sliding gear 16 for meshing with the fifth gear 20 is mounted to the shaft sleeve 121 of the propeller shaft 12 via a fifth spline 161. A third sliding gear 11 meshing with the sixth gear 8 is mounted to the right portion of the propeller shaft 12 via a sixth spline 111. The slidable engaging member 13 is provided to connect the front left wheel output shaft 14 with the front right wheel output shaft 15. And the front left wheel output shaft 14 is mounted within the front right wheel output shaft 15.

Recesses 71 and 131 are provided at the outer surface of the first sliding gear 7 and the slidable engaging member 13, respectively, to accommodate forks (not shown), which extend out of the housing 21.

The operation of the transmission mechanism 100 of the present invention will now be described as follows. The driving power is transmitted to the first sliding gear 7 through the driving power input shaft 1. When the first sliding gear 7 slides, it can be regulated to mesh with either the third larger gear 603 of the third dual tandem gear 6 or the inner gear 502 of the second dual tandem gear 5 to make the vehicle obtain different speeds. The driving power through the second smaller gear 501 of the second dual tandem gear 5 is transmitted to the ring gear 17 of the caseless differential mechanism 19 and drives the caseless differential mechanism 19 to rotate. The driving power through the caseless differential mechanism 19 is divided into two parts by the right side bevel gear 9 and the left side bevel gear 18. The driving power through the right side bevel gear 9 is directly transmitted to a rear right output shaft (not shown) that is connected to the rear right wheel. Meanwhile, the right side bevel gear 9 drives the propeller shaft 12 via the sixth gear 8 and the third sliding gear 11 to rotate. Then, the rotated propeller shaft 12 drives the front left wheel output shaft 14 to rotate via the slidable engaging member 13 in connection with the propeller shaft 12 and the shaft 14.

The driving power through the left side bevel gear 18 is divided into two subparts. The fifth gear 20 splined to the left side bevel gear 18 meshes with both the second sliding gear 16 and the first dual tandem gear 2. A subpart of the driving power is transmitted to the shaft sleeve 121 and to thereby drive the front right wheel output shaft 15 via the slidable engaging member 13. And another subpart of the driving power is transmitted to the rear right wheel output shaft 3 through the second dual tandem gear 4. As a result, the two front output shafts 14, 15 are regulated to drive by regulating the slidable engaging member 13, and the two rear output shafts are driven in a parallel manner. With the transmission mechanism 19 of the present invention, the wheels at the same side can be driven at the same time.

When an automotive vehicle equipped the transmission mechanism of the invention moves on weaker roads, even though a wheel skids and loses the adhesion to the ground, the output power of the engine will not decrease because the skidding wheel doesn't rotate. On the other hand, another unskidding wheel at the same side can still be driven because the two wheels are controlled by the same side bevel gear. Because other two wheels at another side are controlled by another side bevel gear, the vehicle can run as normally. As a result, when two wheels at the same side skid, the vehicle can move via other two unskidding wheels at the same side, and when two wheels at the different sides skid, the automotive vehicle can also move via other two unskidding wheels at the different sides.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. A transmission mechanism for an automotive vehicle comprising
   a housing (21) having a first bearing bracket (211) disposed at the upper portion thereof, a second bearing bracket (212) disposed at the lower portion thereof, a third bearing bracket (213) disposed at the left portion thereof and a fourth bearing bracket (216) disposed at the right portion thereof;
   a caseless differential mechanism (19) including a right side bevel gear (9), a left side bevel gear (18) and a ring gear (17);

a driving power input shaft (1) mounted within said first bearing bracket (211) of said housing (21);

a first dual tandem gear (2) mounted on said driving power input shaft (1);

a second dual tandem gear (5) mounted on said driving power input shaft (1) at middle portion thereof;

a first sliding gear (7) slidably fixed on said driving power input shaft (1);

a rear right wheel output shaft (3) mounted within said third bearing bracket (213);

a fourth gear (4) fixed on said rear right wheel output shaft (3) and engaged to said first dual tandem gear (2);

a third dual tandem gear (6) mounted on said rear right wheel output shaft (3) and engaged to said second dual tandem gear (5) and said first gear (7);

a core shaft (10) mounted within said sixth bearing bracket (216), on which said caseless differential mechanism (19) is mounted;

a fifth gear (20) connected with said left side bevel gear (18) and engaged to said first dual tandem gear (2);

a sixth gear (8) connected with said right ride bevel gear (9);

a propeller shaft (12) mounted within said second bearing bracket (212);

a second sliding gear (16) mounted on a shaft sleeve (121) of said propeller shaft (12);

a third sliding gear (11) fixed to said propeller shaft (12);

a slidable engaging member (13) connected with said propeller shaft (12);

a front left wheel output shaft (14) engaged with said slidable engaging member (13); and a front right wheel output shaft (15) engaged with said slidable engaging member (13), wherein when said driving power input shaft (1) is driven, said first sliding gear (7) can be regulated to mesh with either said third dual tandem gear (6) or said second dual tandem gear (5), so that the automotive vehicle can obtain different speeds, and wheels at the same side of the automotive vehicle can be driven at the same time.

2. The transmission mechanism of claim 1, wherein said fifth gear is mounded on a left shaft sleeve (181) extended from said left side bevel gear (18), and a sixth gear (8) is provided to be mounted on a right shaft sleeve (91) extended from said right side bevel gear (9).

3. The transmission mechanism of claim 1, wherein said second dual tandem gear (5) includes a second larger gear (503) and an inner gear (502) disposed at a side surface opposite to said first sliding gear (7) to mesh therewith, and said third dual tandem gear (6) includes a third larger gear (603) and a third smaller gear (601) to mesh with said first sliding gear (7) and said second larger gear (503) of said second dual tandem gear (5), respectively.

4. The transmission mechanism of claim 2, wherein said second dual tandem gear (5) includes a second larger gear (503) and an inner gear (502) disposed at a side surface opposite to said first sliding gear (7) to mesh therewith, and said third dual tandem gear (6) includes a third larger gear (603) and a third smaller gear (601) to mesh with said first sliding gear (7) and said second larger gear (503) of said second dual tandem gear (5), respectively.

5. The transmission mechanism of claim 1, wherein said first dual tandem gear (2) includes a first larger gear (203) and a first smaller gear (201) to respectively mesh with said fifth gear (20) and said fourth gear (4).

6. The transmission mechanism of claim 2, wherein said first dual tandem gear (2) includes a first larger gear (203) and a first smaller gear (201) to respectively mesh with said fifth gear (20) and said fourth gear (4).

7. The transmission mechanism of claim 3, wherein said first dual tandem gear (2) includes a first larger gear (203) and a first smaller gear (201) to respectively mesh with said fifth gear (20) and said fourth gear (4).

8. The transmission mechanism of claim 4, wherein said first dual tandem gear (2) includes a first larger gear (203) and a first smaller gear (201) to respectively mesh with said fifth gear (20) and said fourth gear (4).

9. The transmission mechanism of claim 1, wherein each of said first sliding gear (7) and said slidable engaging member (13) provides a recess (71, 131) at the outer surface thereof for connecting a fork.

10. The transmission mechanism of claim 2, wherein each of said first sliding gear (7) and said slidable engaging member (13) provides a recess (71, 131) at the outer surface thereof for connecting a fork.

11. The transmission mechanism of claim 3, wherein each of said first sliding gear (7) and said slidable engaging member (13) provides a recess (71, 131) at the outer surface thereof for connecting a fork.

12. The transmission mechanism of claim 1, wherein said first sliding gears (7) is splined to said driving power input shaft (1).

13. The transmission mechanism of claim 2, wherein said first sliding gears (7) is splined to said driving power input shaft (1).

14. The transmission mechanism of claim 3, wherein said first sliding gears (7) is splined to said driving power input shaft (1).

15. The transmission mechanism of claim 5, wherein said first sliding gears (7) is splined to said driving power input shaft (1).

16. The transmission mechanism of claim 2, wherein said front left wheel output shaft (14) is mounted within said front right wheel output shaft (15).

17. The transmission mechanism of claim 3, wherein said front left wheel output shaft (14) is mounted within said front right wheel output shaft (15).

18. The transmission mechanism of claim 5, wherein said front left wheel output shaft (14) is mounted within said front right wheel output shaft (15).

19. The transmission mechanism of claim 9, wherein said front left wheel output shaft (14) is mounted within said front right wheel output shaft (15).

20. The transmission mechanism of claim 12, wherein said front left wheel output shaft (14) is mounted within said front right wheel output shaft (15).

* * * * *